UNITED STATES PATENT OFFICE.

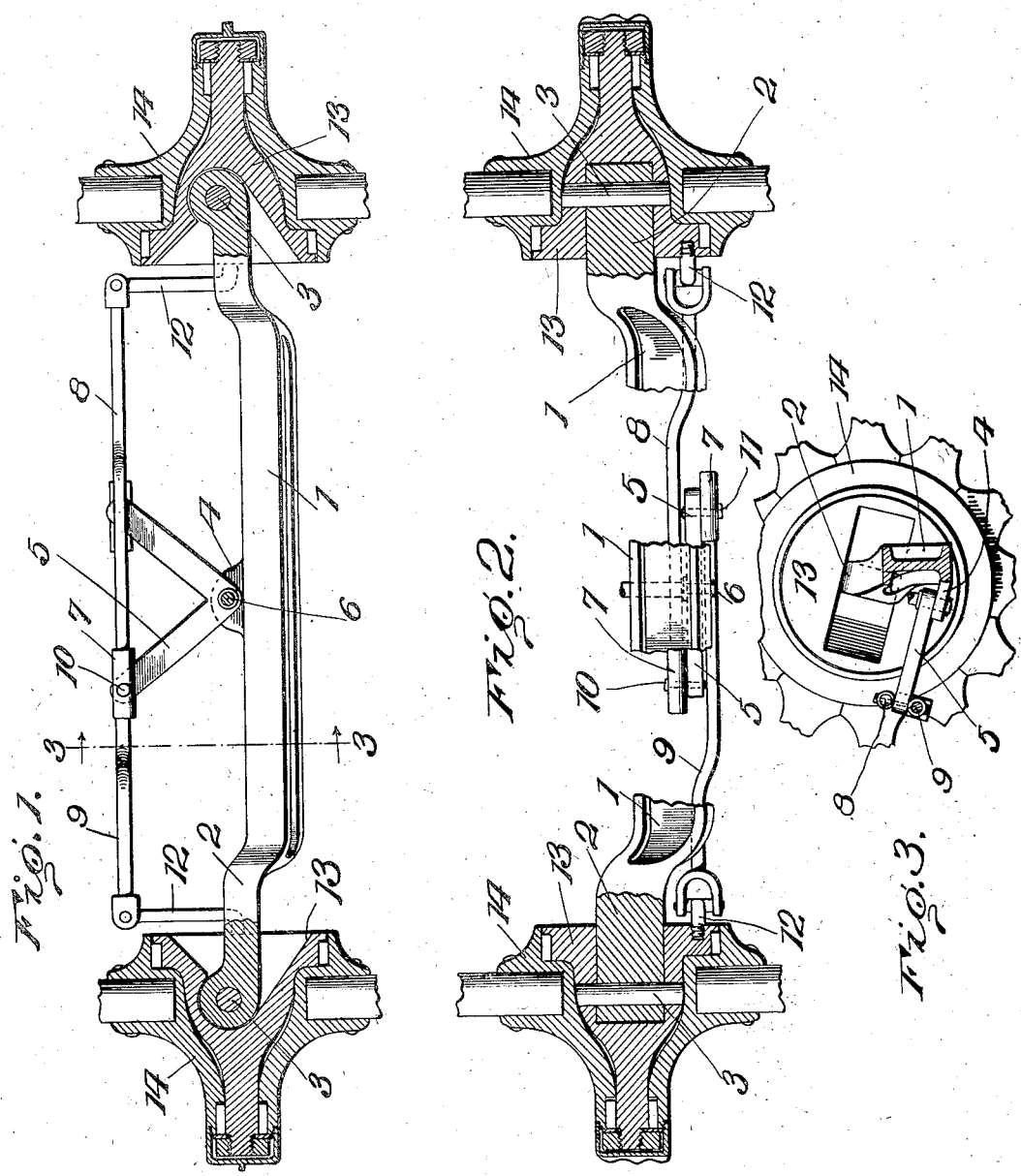

FRANK A. BOWMAN AND JOHN E. BRIGGS, OF GILBERT, MINNESOTA.

STEERING-GEAR.

1,109,316.  Specification of Letters Patent.  Patented Sept. 1, 1914.

Application filed May 20, 1913. Serial No. 768,882.

*To all whom it may concern:*

Be it known that we, FRANK A. BOWMAN and JOHN E. BRIGGS, citizens of the United States, residing at Gilbert, in the county of St. Louis and State of Minnesota, have invented certain new and useful Improvements in Steering-Gears, of which the following is a specification.

This invention relates to steering gear for automobiles, and has special reference to means for shifting wheels mounted as disclosed in an application for patent filed by us February 25, 1913, Serial No. 750,685. In our said application, we disclosed a wheel which is pivotally connected to the end of an axle, the pivotal point being in the radial plane of the spokes of the wheel. Inasmuch as the pivotal point is in the plane of the spokes, an ordinary straight radius rod cannot be utilized to successfully steer the vehicle for the reason that such rod will not then give an equal throw to both wheels, and the object of our present invention is to provide a simple compactly arranged and easily operated means for shifting the wheels about their pivotal connections with the axle.

The invention is illustrated in the accompanying drawings, in which:

Figure 1 is a plan view of the improvement showing it in its operative position and illustrating the wheel hubs in section; Fig. 2 is an elevation with parts broken away and the wheels in section; Fig. 3 is a transverse section on the line 3—3 of Fig. 1;

The axle 1 is of the usual form and material with its ends 2 slightly offset and twisted so as to accommodate the pivot pins 3 which are set at an inclination or angle to the vertical so that when the wheels are turned about the pivotal points the upper edges of the wheels will swing toward the centers of the arcs over which the wheels travel, as set forth in our aforesaid application. At the center of the axle, we provide a bracket or lug 4 upon which is pivoted an equalizing lever 5 consisting of diverging arms fulcrumed at their meeting ends upon a pin 6 which is carried by the lug or bracket 4. The outer ends of the diverging arms of this lever are pivoted to enlargements 7 at the inner ends of upper and lower radius rods 8 and 9, one arm being pivoted to the upper radius rod, as shown at 10, while the other arm is pivoted to the lower radius rod, as shown at 11. The outer ends of the radius rods are pivotally connected to arms 12 rigid with and extending forwardly from the blocks or stub-axles 13 upon which the hubs 14 of the wheels are mounted to rotate, it being understood that the pivot pins 3 are inserted through the stub-axles 13 and the ends of the main axle 1. It will be noted that the inner ends of the radius rods 8 and 9 extend past each other so that the said rods have an overlapping relation, and it will also be noted that the pivot 6 and the two pivots 3 are in one line, and a line drawn through the pivots 6 and 10 will be parallel to a line drawn through the right-hand pivot 3 in Fig. 1 and the pivotal connection between the upper radius rod 8 and the adjacent arm 12, while a line drawn through the pivot 6 and the pivot 11 will be parallel to a line drawn through the left-hand pivot 3 and the pivotal connection between the lower radius rod 9 and the adjacent arm 12. By reason of this arrangement, the wheels at both sides of the vehicle will be given the same throw and, consequently, the steering of the vehicle will be accomplished positively and easily without any tendency to buckling of the axle or other damage to any of the parts.

The steering column mounted upon the body of the vehicle may be connected to one of the radius rods or to the fulcrum pin 6 or otherwise attached, as may be preferred or deemed advisable. When movement is imparted to any one of the members of the steering mechanism, all the other parts will be simultaneously moved, as they are positively connected and inasmuch as each radius rod is connected directly to only one wheel and a swinging connection is provided between the two steering rods, their inner ends may move freely in similar arcs without any tendency of the parts to bind or break. The device is obviously simple and inexpensive and will be found highly efficient for the purposes for which it is designed.

What we claim is:—

The combination of an axle, wheels pivotally mounted thereon, the pivots being disposed in the diametrical plane of the wheels and between the sides of the wheels, arms rigidly connected to said wheels at one side of the axle and extending laterally therefrom, steering rods pivoted at their outer ends to the free ends of said arms and having their inner ends overlapping, and an equalizing lever consisting of diverging arms fulcrumed at their meeting ends upon the axle and having their free ends pivoted to the inner ends of the respective steering rods, said diverging arms being parallel with lines passing through the outer ends of the steering rods to which they are respectively pivoted and the pivotal connection of the axle with the wheel adjacent said steering rod.

In testimony whereof we affix our signatures in presence of two witnesses.

FRANK A. BOWMAN. [L. S.]
JOHN E. BRIGGS. [L. S.]

Witnesses:
H. LINDAHL,
A. B. SHANK.